(12) United States Patent
Behzadi et al.

(10) Patent No.: US 9,372,563 B2
(45) Date of Patent: Jun. 21, 2016

(54) EDITING ON A TOUCHSCREEN

(71) Applicant: Adobe Systems Incorporated, San Jose, CA (US)

(72) Inventors: Arian Behzadi, San Francisco, CA (US); Gregory Cy Muscolino, Novato, CA (US)

(73) Assignee: Adobe Systems Incorporated, San Jose, CA (US)

( * ) Notice: Subject to any disclaimer, the term of this patent is extended or adjusted under 35 U.S.C. 154(b) by 253 days.

(21) Appl. No.: 14/270,256

(22) Filed: May 5, 2014

(65) Prior Publication Data
US 2015/0317004 A1 Nov. 5, 2015

(51) Int. Cl.
*G06F 3/041* (2006.01)
*G06F 3/0354* (2013.01)
*G06F 3/0488* (2013.01)

(52) U.S. Cl.
CPC .............. *G06F 3/041* (2013.01); *G06F 3/0354* (2013.01); *G06F 3/0488* (2013.01)

(58) Field of Classification Search
CPC ..... G06F 3/041; G06F 3/04842; G06F 17/24; G06F 2203/04101; G06F 2203/04108; G06F 3/033; G06F 3/039; G06F 3/0416; G06F 3/0481; G06F 3/0482; G06F 3/0484; G06F 3/0488
USPC .................................................. 345/156–184
See application file for complete search history.

(56) References Cited

U.S. PATENT DOCUMENTS

| 8,896,621 | B1* | 11/2014 | Sipher ................. | G06F 3/04883 345/418 |
| 9,098,186 | B1* | 8/2015 | Worley ................. | G06F 3/0488 |
| 2011/0175821 | A1* | 7/2011 | King ................... | G06F 3/04883 345/173 |
| 2012/0206330 | A1* | 8/2012 | Cao ........................ | G06F 3/0383 345/156 |
| 2012/0313865 | A1* | 12/2012 | Pearce .................. | G06F 3/0416 345/173 |
| 2012/0313870 | A1* | 12/2012 | Homma .................. | G06T 11/20 345/173 |
| 2013/0321350 | A1* | 12/2013 | Mesaros ............... | G06F 3/0488 345/179 |
| 2014/0210748 | A1* | 7/2014 | Narita ................... | G06F 3/0354 345/173 |
| 2015/0145784 | A1* | 5/2015 | Dowd .................. | G06F 3/04883 345/173 |
| 2015/0338974 | A1* | 11/2015 | Stone .................... | G06F 3/0488 345/173 |

* cited by examiner

*Primary Examiner* — Amare Mengistu
*Assistant Examiner* — Gloryvid Figueroa-Gibson
(74) *Attorney, Agent, or Firm* — Shook, Hardy & Bacon, L.L.P.

(57) ABSTRACT

A touchscreen device is configured to facilitate editing on a touchscreen. The touchscreen device determines a position of a guide device on the touchscreen and determines an axis of the guide device on the touchscreen. The touchscreen device displays a first line on the touchscreen parallel to the axis of the guide device, while the touchscreen displays a second line on the touchscreen. The touchscreen device detects movement of the guide device on the touchscreen and moves the first line on the touchscreen based on the detected movement. The touchscreen device moves the first line to coincide with the second line in response to a determination that the first line is within the threshold distance of the second line. The touchscreen device then indicates that the second line is selected for potential editing.

20 Claims, 17 Drawing Sheets

EDITING ON A TOUCHSCREEN

TECHNICAL FIELD

The subject matter disclosed herein generally relates to the processing of data. Specifically, the present disclosure addresses systems and methods to facilitate editing on a touchscreen.

BACKGROUND

A touchscreen device may include a touchscreen (e.g., a touch-sensitive display screen) that is configured to both present (e.g., display) visual information and receive touch input from a user (e.g., one or more touches on the touchscreen). The visual information (e.g., visual content) may be displayed using a graphical user interface (e.g., within one or more windows or full-screen within the edges of the touchscreen). The user input may be submitted by a user of the touchscreen device, for example, by contacting (e.g., touching) the touchscreen with a body part (e.g., a fingertip) or with a stylus. Examples of a touchscreen device include a tablet computer (e.g., iPad® by Apple Inc.), a smart phone (e.g., iPhone)® by Apple Inc.), a laptop computer (e.g., configured with a touchscreen), a kiosk computer (e.g., configured with a touchscreen), and any suitable combination thereof.

In some situations, a touchscreen device may be used to create and edit drawings on the touchscreen. However, it may be problematic to provide a convenient or intuitive user interface for selecting one or more parts of a drawing displayed on the touchscreen. For example, it may be problematic to provide a user interface that quickly and easily allows a user to select a part of a drawing. As another example, it may be problematic to provide a user interface that automatically selects a part of a drawing for potential editing.

BRIEF DESCRIPTION OF THE DRAWINGS

Some embodiments are illustrated by way of example and not limitation in the figures of the accompanying drawings.

DETAILED DESCRIPTION

Example methods and systems are directed to editing on a touchscreen. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A touchscreen device includes a touchscreen and is configured to facilitate editing on the touchscreen. In particular, the touchscreen device is configured to determine a position of a guide device on the touchscreen, as well as determine an axis of the guide device on a touchscreen. As configured, the touchscreen device displays a first line (e.g., a guide line) on the touchscreen, and the first line may be displayed parallel to the axis of the guide device. Moreover, the first line may be displayed while the touchscreen displays a second line (e.g., a previously drawn line) on the touchscreen. The touchscreen device detects movement of the guide device on the touchscreen and moves the first line on the touchscreen based on the detected movement. The touchscreen device is further configured to move the first line to coincide with the second line in response to a determination (e.g., made by the touchscreen device) that the first line is within a threshold distance of the second line. As configured, the touchscreen device indicates that the second line (e.g., coincident with the moved first line) is selected (e.g., automatically selected) for potential editing. For example, this may include highlighting (e.g., by displaying a marker or using a different color) one or more points on the second line to indicate that the second line has been automatically selected.

As used herein, the phrase "guide device" refers to any device (e.g., a companion device for the touchscreen device) configured to trigger a set of one or more contact signals on a touchscreen of a touchscreen device. For example, the guide device may be or include a straightedge device (e.g., a device that resembles a straightedge or ruler). In some example embodiments, the guide device has at least one straight side that is parallel with an axis (e,g., the longitudinal axis) of the guide device. For clarity, a guide device in the example form of a rectangular straightedge device is discussed below and illustrated in the accompanying drawings. However, the guide device may take any of various other forms, including being circular, oval, triangular, star-shaped, irregularly shaped, or any suitable combination thereof.

Figure 1:
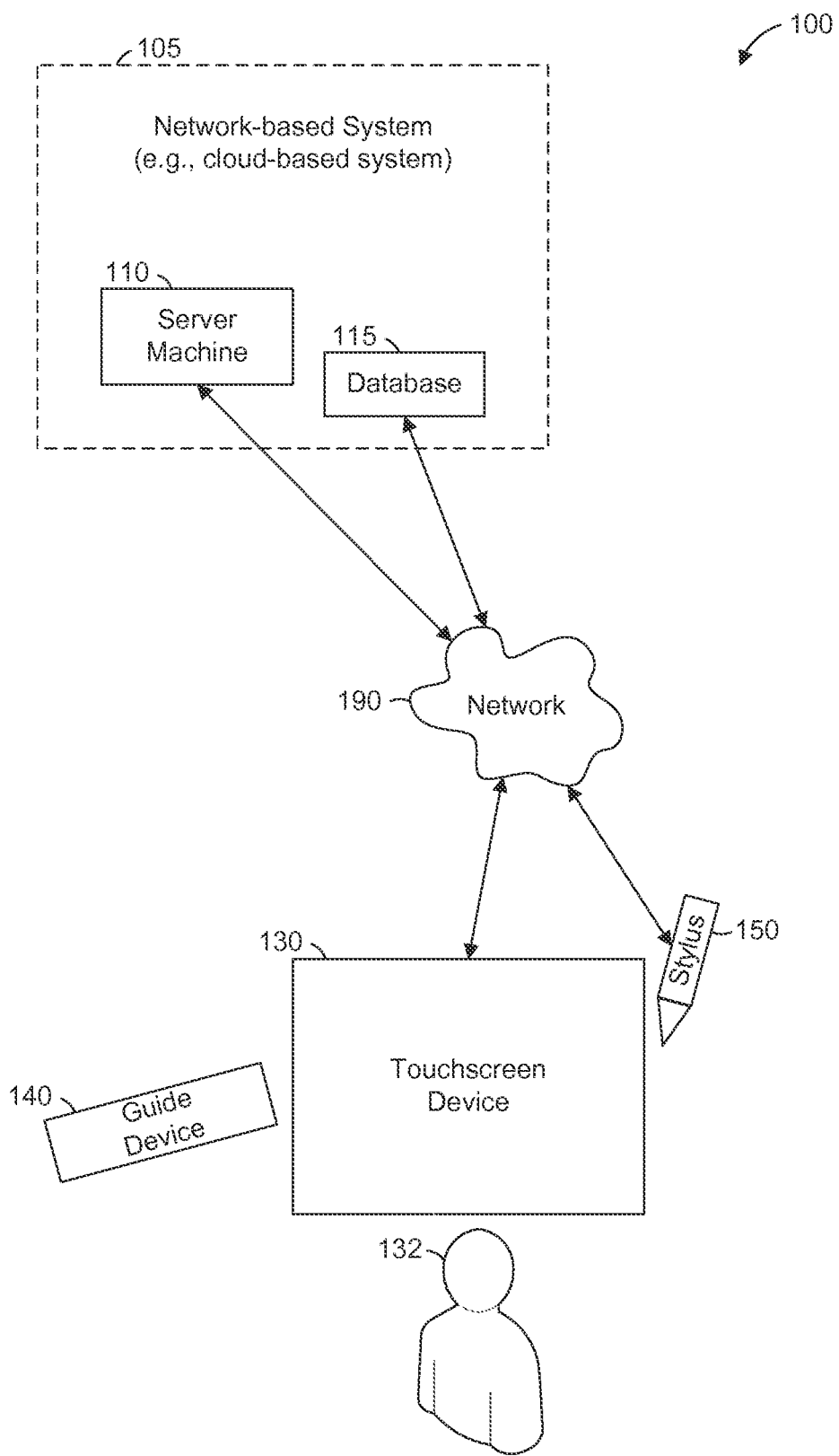
FIG. 1 is a network diagram illustrating a network environment suitable for editing on a touchscreen, according to some example embodiments.

FIG. 1 is a network diagram illustrating a network environment 100 suitable for editing on a touchscreen, according to some example embodiments. The network environment 100 includes a server machine 110, a database 115, a touchscreen device 130, and a stylus 150, all communicatively coupled to each other via a network 190. The server machine 110, the database 115, the touchscreen device 130, a guide device 140, and the stylus 150 may each be implemented in a suitably sized computer system, in whole or in part, as described below with respect to FIG. 17. Moreover, the guide device 140, the stylus 150, or both, may be configured to interoperate with the touchscreen device 130. For example, the guide device 140 may be built or adapted to trigger one or more contact signals on a touchscreen of the touchscreen device 130, when the guide device 140 is placed fully or partially on the touchscreen of the touchscreen device 130. As another example, the stylus 150 may be built or adapted to trigger a contact signal on the touchscreen of the touchscreen device 130.

Also shown in FIG. 1 is a user 132 of the touchscreen device 130. The user 132 may be a human user (e.g., a human being), a machine user (e.g., a computer-controlled robot configured by a software program to interact with the touchscreen device 130, the guide device 140, and the stylus 150, for example, to mimic a human user), or any suitable combination thereof (e.g., a human assisted by a machine or a machine supervised by a human). The user 132 is not part of the network environment 100, but corresponds to the touchscreen device 130 and may be a user of the touchscreen device 130, a user of the guide device 140, a user of the stylus 150, or any suitable combination thereof. For example, the touchscreen device 130 may be or include a desktop computer, a vehicle computer, a tablet computer, a navigational device, a portable media device, or a smart phone belonging to the user 132.

The server machine 110, with or without the database 115, may form all or part of a network-based system 105 (e.g., a cloud-based creativity support system). The server machine 110 may store files and settings that correspond to the user 132 (e.g., files that belong to the user 132, files that the user 132 is authorized to access, or a profile of preferences set by the user 132). For example, the server machine 110 may store one or more files and settings (e.g., a profile of preferences) of the user 132 in the database 115 for subsequent access and retrieval (e.g., downloading to the touchscreen device 130). An example of such a file is a previously saved drawing generated by the user 132, or a portion of such a drawing, such as a user-generated shape.

The touchscreen device 130 has a touchscreen and may be used by the user 132 to draw one or more objects (e.g., lines or shapes, in various colors) on the touchscreen. The touchscreen device 130 may be configured to interoperate with the stylus 150, which may be configured to access the server machine 110 and retrieve one or more files or settings of the user 132. For example, the stylus 150 may be configured (e.g., with suitable hardware and software) to wirelessly communicate with the touchscreen device 130 (e.g., via the network 190, or via another network, such as a Bluetooth network). This may have the effect of allowing the user 132 to access his files, settings, or both, on any touchscreen device (e.g., touchscreen device 130) by bringing the stylus 150 to any touchscreen device and using the stylus 150 with that touchscreen device.

Any of the machines, databases, or devices shown in FIG. 1 may be implemented in a suitably sized general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 17. As used herein, a "database" is a data storage resource and may store data structured as a text file, a table, a spreadsheet, a relational database (e.g., an object-relational database), a triple store, a hierarchical data, store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the touchscreen device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible medium that is capable of storing, encoding, or carrying instructions for execution by a machine, and includes digital or analog communication signals or other intangible media to facilitate communication of such software.

Figure 2:
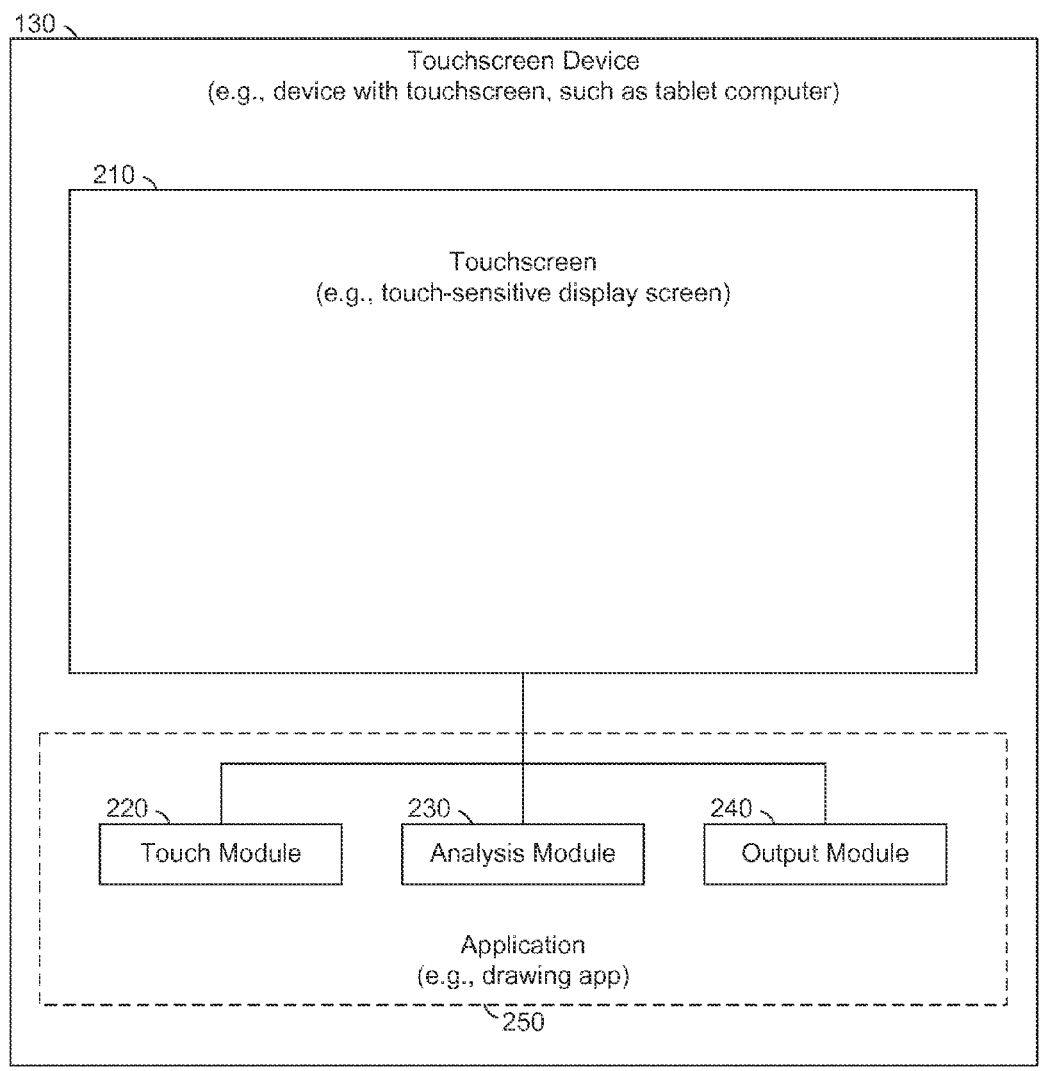
FIG. 2 is a block diagram illustrating components of a touchscreen device suitable for editing on a touchscreen, according to some example embodiments.

FIG. 2 is a block diagram illustrating components of the touchscreen device 130, according to some example embodiments. The touchscreen device 130 includes a touchscreen 210, which may be or include a touch-sensitive display screen and which may be configured to display visual information (e.g., one or more drawn objects, images, video, elements of a graphical user interface, or other visual content) and receive touch input generated by the user 132 (e.g., contact signals resulting from touches of the stylus 150 or a fingertip of the user 132). The touchscreen device 130 is shown as including the touchscreen 210, a touch module 220, an analysis module 230, and an output module 240, all configured to communicate with each other (e.g., via a bus, shared memory, or a switch). As shown in FIG. 2, the touch module 220, the analysis module 230, and the output module 240 may form all or part of an application 250 (e.g., a drawing application or a mobile app for making and editing drawings) that is executable by the touchscreen device 130.

The touch module 220 is configured to detect touches on the touchscreen 210 and distinguish touches by the guide device 140 from other touches on the touchscreen 210 (e.g., by the stylus 150 or by a fingertip of the user 132). The touch module 220 may detect a set of one or more locations at which placement of the guide device 140 on the touchscreen 210 triggers a corresponding set of one or more contact points on the touchscreen 210.

The analysis module 230 is configured to determine the position of the guide device 140 on the touchscreen 210 and the orientation (e.g., angular orientation) of the guide device 140 on the touchscreen 210. The analysis module 230 may determine the position and the orientation of the guide device 140 by determining an axis (e.g., the longitudinal axis) of the guide device 140 (e.g., based on the set of locations detected by the touch module 220).

The output module 240 is configured to display one or more lines, one or more shapes, or both, on the touchscreen 210. The output module 240 may cause the touchscreen 210 to display one or more lines (e.g., guide lines) or shapes, based on the determined position and orientation of the guide device 140 (e.g., as determined by the analysis module 230).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
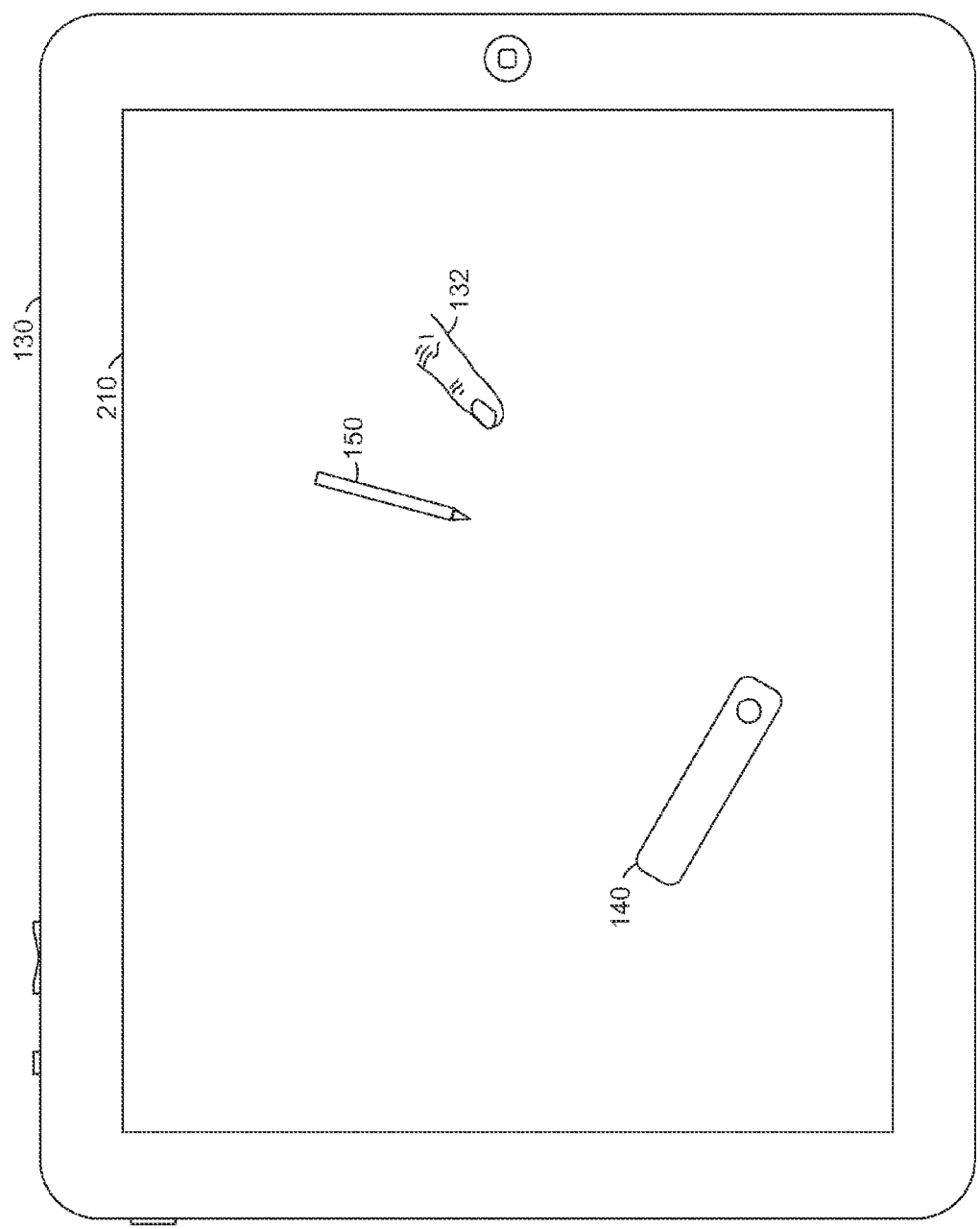
FIG. 3 is a top plan view of the touchscreen device, illustrating a guide device, a stylus, and a body part of a user in contact with the touchscreen device, according to some example embodiments.

FIG. 3 is a top plan view of the touchscreen device 130, illustrating the guide device 140, the stylus 150, and a body part (e.g., a body member, such as a fingertip) of the user 132 in contact with the touchscreen device 130, according to some example embodiments. As shown, the touchscreen device 130 encompasses the touchscreen 210, on which may be placed the guide device 140, the stylus 150, the body part of the user 132, or any suitable combination thereof. Accordingly, one or more of the guide device 140, the stylus 150, and the body part of the user 132 may be placed in contact with the touchscreen 210 and accordingly trigger one or more contact signals on the touchscreen 210. Each of the triggered contact signals may have a corresponding location on the touchscreen 210. Moreover, moving (e.g., dragging) the placed guide device 140, stylus 150, or body part of the user 132 across the touchscreen 210 may trigger one or more different contact signals that correspond to different locations on the touchscreen 210.

Figure 4:
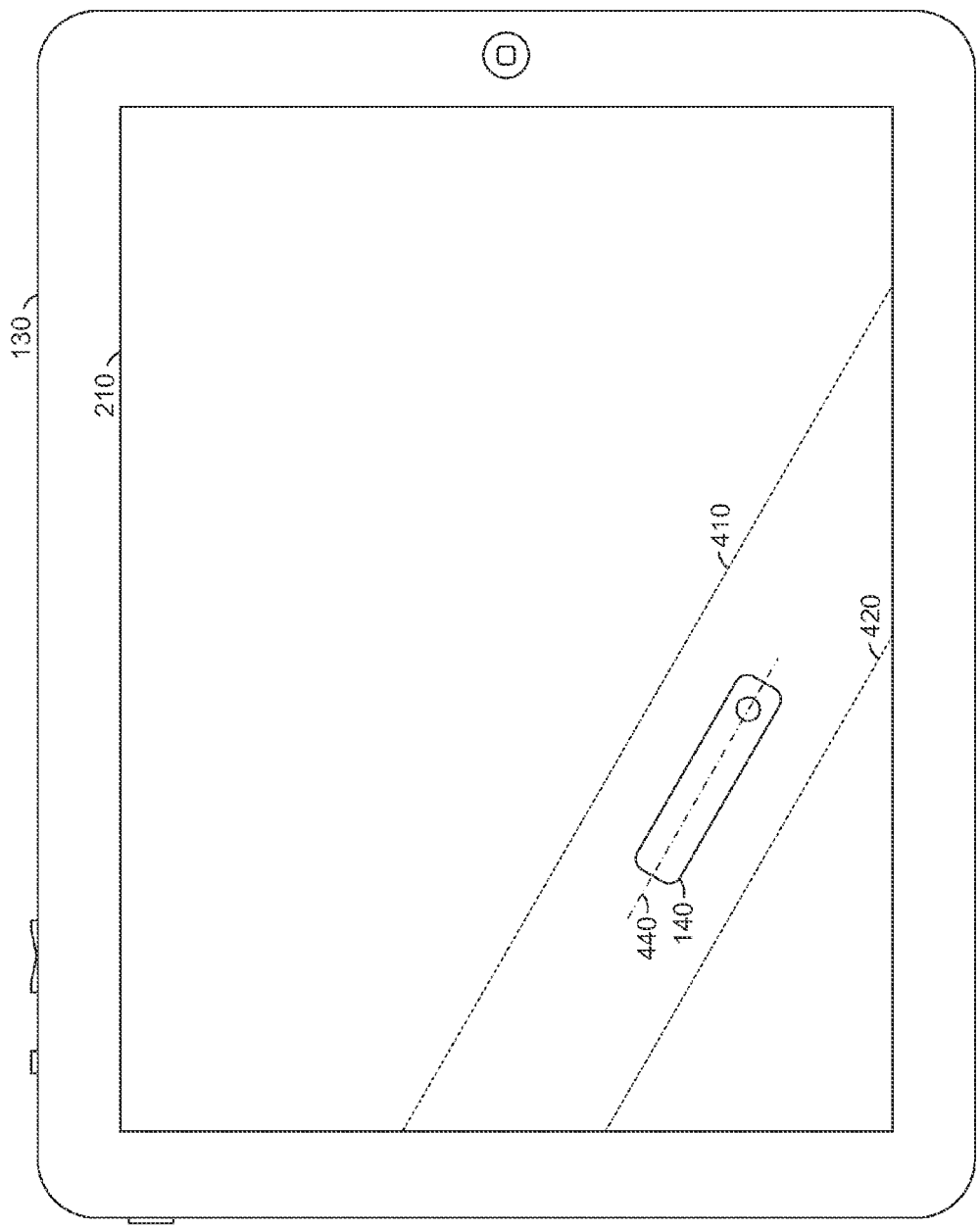
FIG. 4 is a top plan view of the touchscreen device, illustrating the guide device, an axis of the guide device, and guide lines displayed by the touchscreen device based on the axis of the guide device, according to some example embodiments.

FIG. 4 is a top plan view of the touchscreen device 130, illustrating the guide device 140, an axis 440 of the guide device 140, and guide lines 410 and 420 being displayed on the touchscreen 210 of the touchscreen device 130, according to some example embodiments. The guide device 140 is shown as having been placed on the touchscreen 210. The axis 440 may be a longitudinal axis of the guide device 140 (e.g., an axis along or parallel to the longest dimension of the guide device 140), an axis of symmetry of the guide device 140, or both. The touch module 220 may detect a set of locations that correspond to the guide device 140 in contact with the touchscreen 210, and the axis 440 may be determined by the analysis module 230 based on this set of locations. The output module 240 may display one or both of the guide lines 410 and 420 on the touchscreen 210 (e.g., by causing the touchscreen 210 to display one or both of the guide lines 410 and 420). The guide lines 410 and 420 may be displayed based on (e.g., parallel to) the axis 440 of the guide device 140.

As shown in FIG. 4, one or both of the guide lines 410 and 420 may be displayed parallel to the axis 440 of the guide device 140. Moreover, one or both of the guide lines 410 and 420 may be displayed at a distance apart (e,g., separated by the distance, which may be a fixed distance) from the guide device 140. FIG. 4 illustrates the guide lines 410 and 420 extending to the edges of the touchscreen 210, though in various example embodiments one or both of the guide lines 410 and 420 do not extend to the edges of the touchscreen 210.

Figure 5:
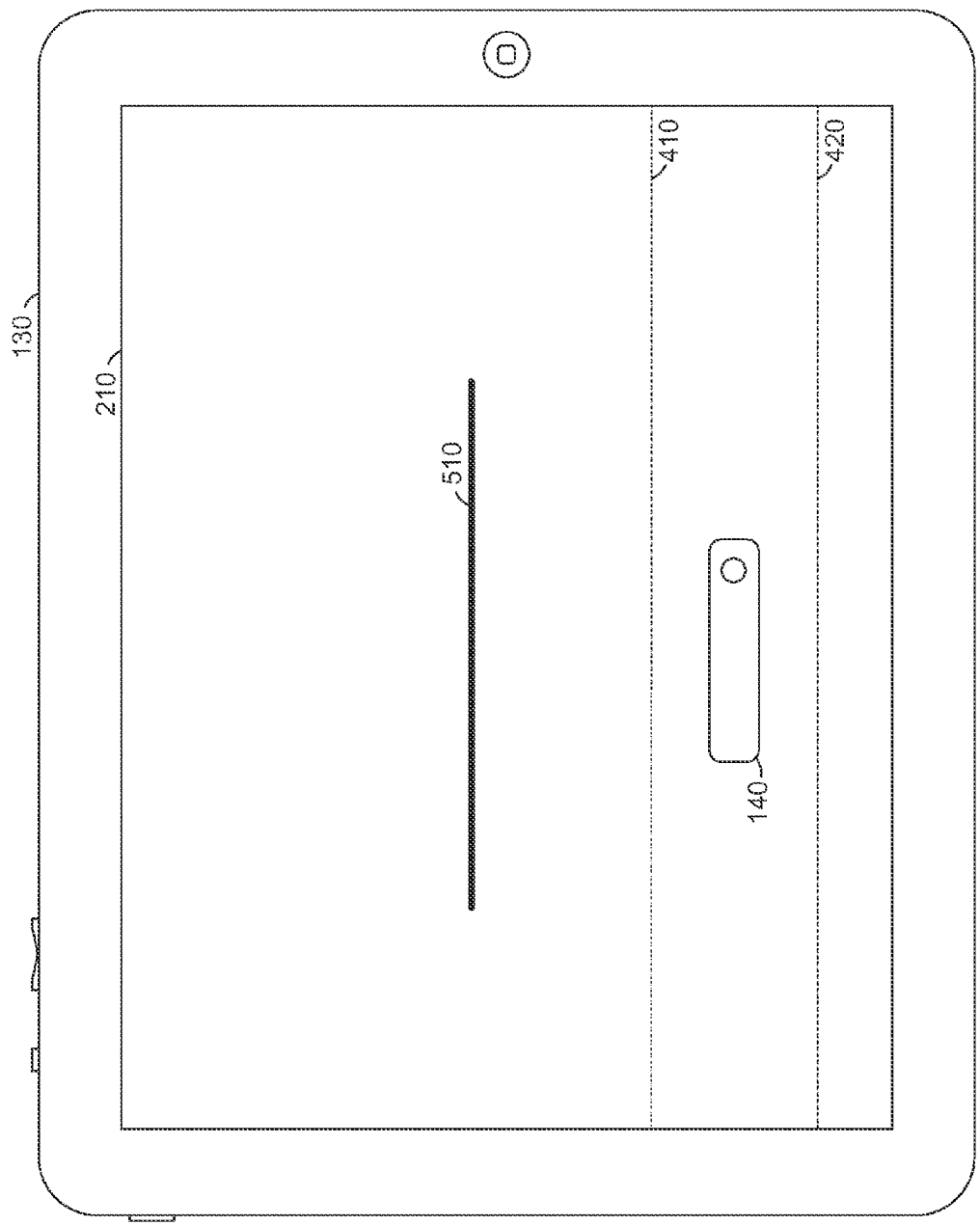
FIG. 5 is a top plan view of the touchscreen device, illustrating the guide device, the guide lines, and a drawn line, according to some example embodiments.

FIG. 5 is a top plan view of the touchscreen device 130, illustrating the guide device 140, the guide lines 410 and 420, and a drawn line 510, according to some example embodiments. The drawn line 510 may be all or part of a previously drawn set of lines, shapes, or any suitable combination thereof (e.g., previously drawn by the user 132 on the touchscreen 210). In the example shown in FIG. 5, both of the guide lines 410 and 420 are beyond a threshold distance of the drawn line 510.

Figure 6:
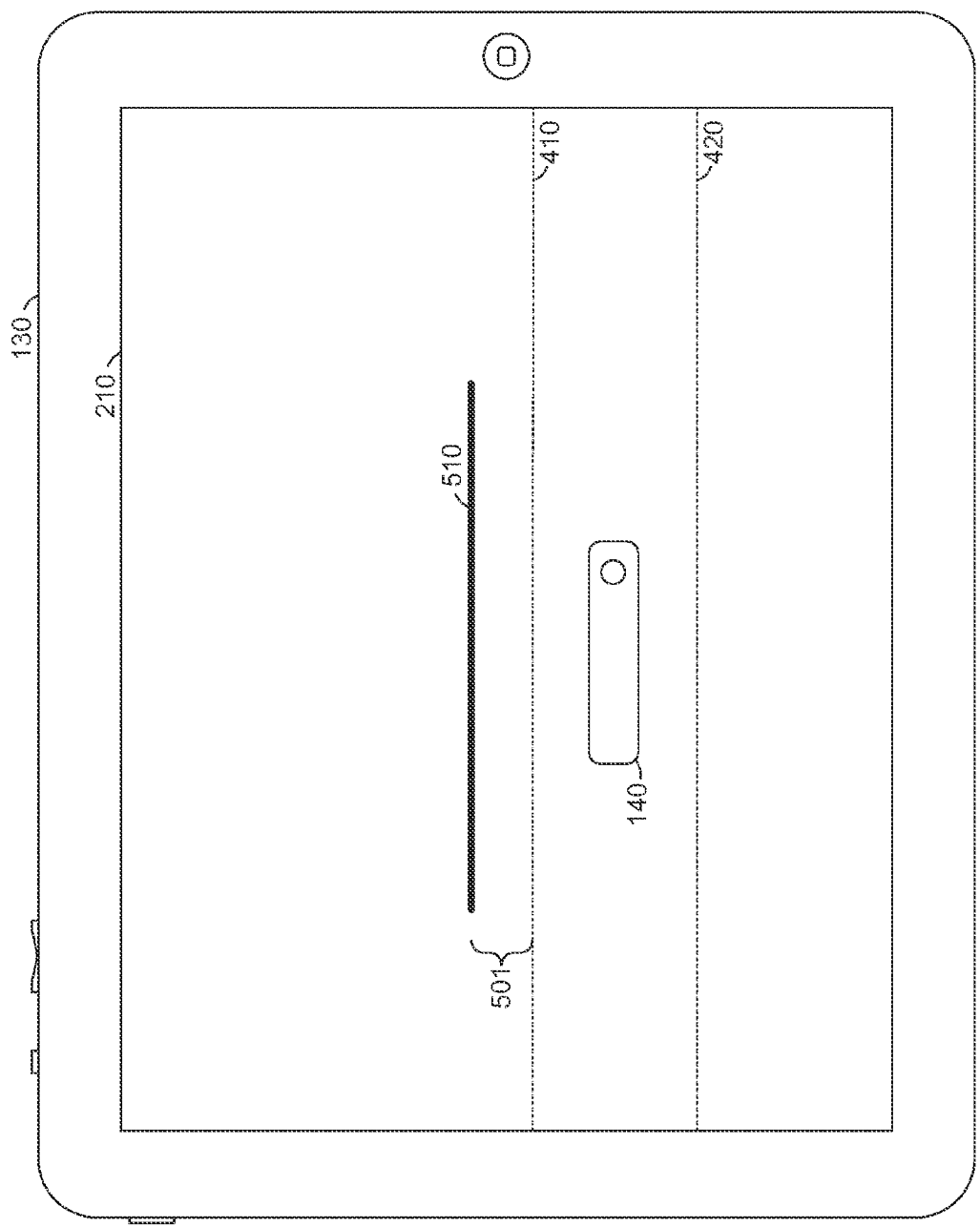
FIG. 6 is a top plan view of the touchscreen device, illustrating the guide device and the guide lines being moved closer to the drawn line so that a guide line is within a threshold distance of the drawn line, according to some example embodiments.

FIG. 6 is a top plan view of the touchscreen device 130, illustrating the guide device 140 and the guide lines 410 and 420 all being moved closer (e.g., together and in unison) to the drawn line 510 so that the guide line 410 is within a threshold distance 501 (e.g., a predetermined threshold distance) of the drawn line 510, according to some example embodiments. For example, the threshold distance 501 may be defined as a quantity of pixels (e.g., 300 pixels), a physical distance (e.g., 1 inch), or any suitable combination thereof, on the touchscreen 210. The fact that the guide line 410 is within the threshold distance 501 of the drawn line 510 may be determined by detecting that a point (e.g., a first point) on the guide line 410 is within the threshold distance 501 of a point (e.g., a second point) on the drawn line 510.

Figure 7:
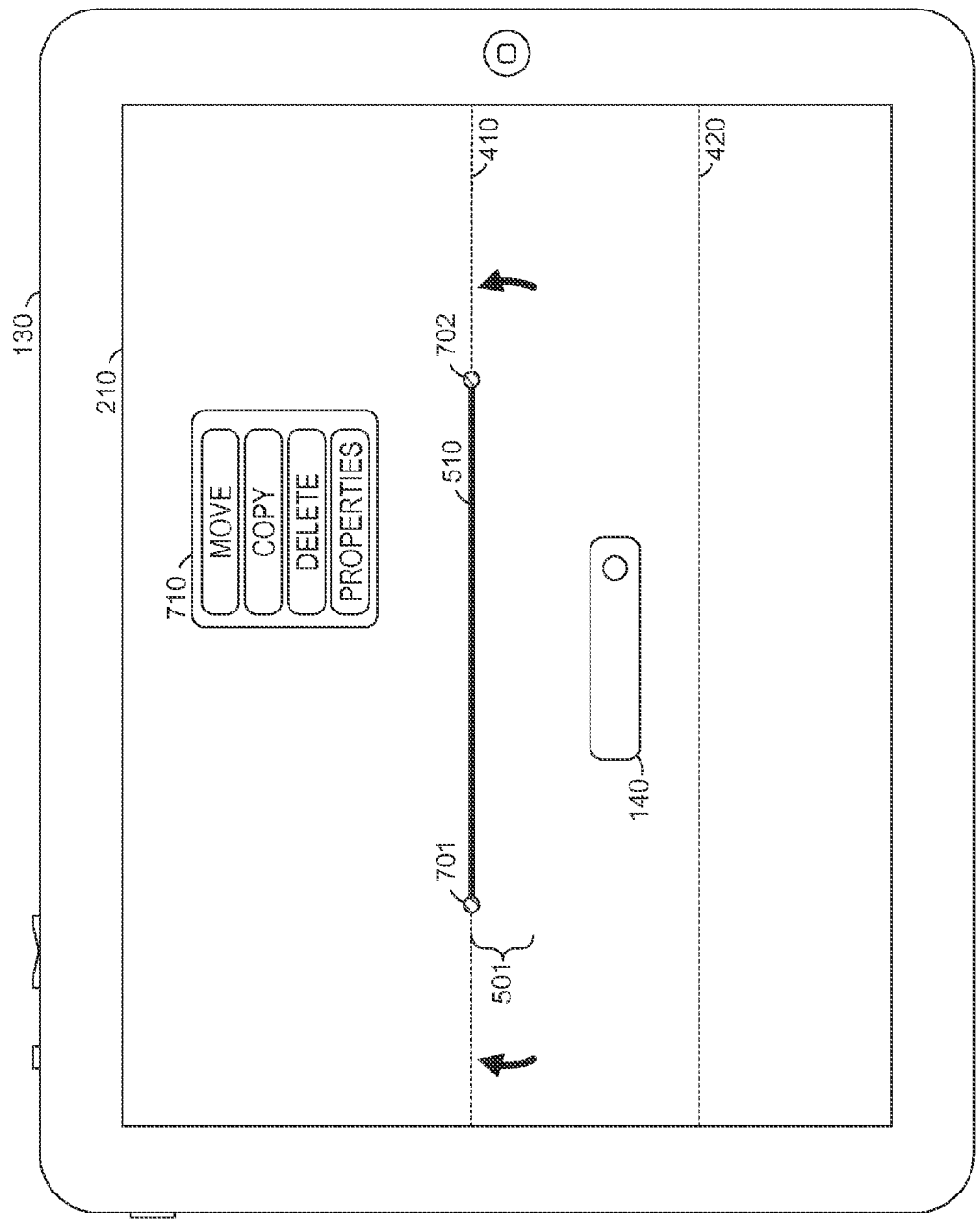
FIG. 7 is a top plan view of the touchscreen device, illustrating a guide line being automatically moved to coincide with the drawn line, which may indicate that the drawn line is automatically selected for potential editing, according to some example embodiments.

FIG. 7 is a top plan view of the touchscreen device 130, illustrating the guide line 410 being automatically moved to coincide with the drawn line 510, which may indicate that the drawn line 510 is automatically selected for potential editing, according to some example embodiments. As shown by the curved arrows in FIG. 7, the guide line 410 has moved towards the drawn line 510 by an amount equal to the threshold distance 501 from its former position depicted in FIG. 6. In FIG. 7, the guide line 410 now coincides with the drawn line 510. Moreover, as shown in FIG. 7, one or more endpoints 701 and 702 (e.g., collinear endpoints) of the drawn line 510 may be highlighted (e.g., to further indicate that the drawn line 510 is automatically selected for potential editing). In particular, the endpoints 701 and 702 may be highlighted by displaying markers (e.g., icons) on the endpoints 701 and 702, and such markers may be wider than the drawn line 510, colored differently from the drawn line 510, or any suitable combination thereof. In situations where a marker is wider than the drawn line 510, the marker may be called a "bumper."

FIG. 7 also illustrates a menu 710 of edits, which may be displayed on the touchscreen 210 in response to the automatic selection of the drawn line 510 for potential editing (e.g., as a result of, or in response to, the guide line 410 moving to coincide with the drawn line 510). In some example embodiments, however, the menu 710 of edits is presented as part of the automatic selection of the drawn line 510. The menu 710 of edits presents one or more available editing operations that may be selected for application to the selected drawn line 510 or any segment thereof. FIG. 7 depicts the menu 710 of edits as offering a "move" function (e.g., for moving the drawn line 510 elsewhere on the touchscreen 210), a "copy" function (e.g., for copying the drawn line 510 into a buffer memory), a "delete" function (e,g., for deleting or erasing the drawn line 510 from the touchscreen 210), and a "properties" function (e.g., for editing one or more properties of the drawn line 510). According to various example embodiments, however, the menu 710 of edits may offer fewer, more, or different operations. In some example embodiments, the user 132 may select an available editing operation (e.g., the "move" function) by activating a control (e.g., by touching an offered function within the menu 710 of edits, or by pressing a hardware button on the guide device 140), and the activation of the control may indicate that subsequent movement of the guide device 140 is input for performing the selected editing operation (e.g., the "move" function).

Figure 8:
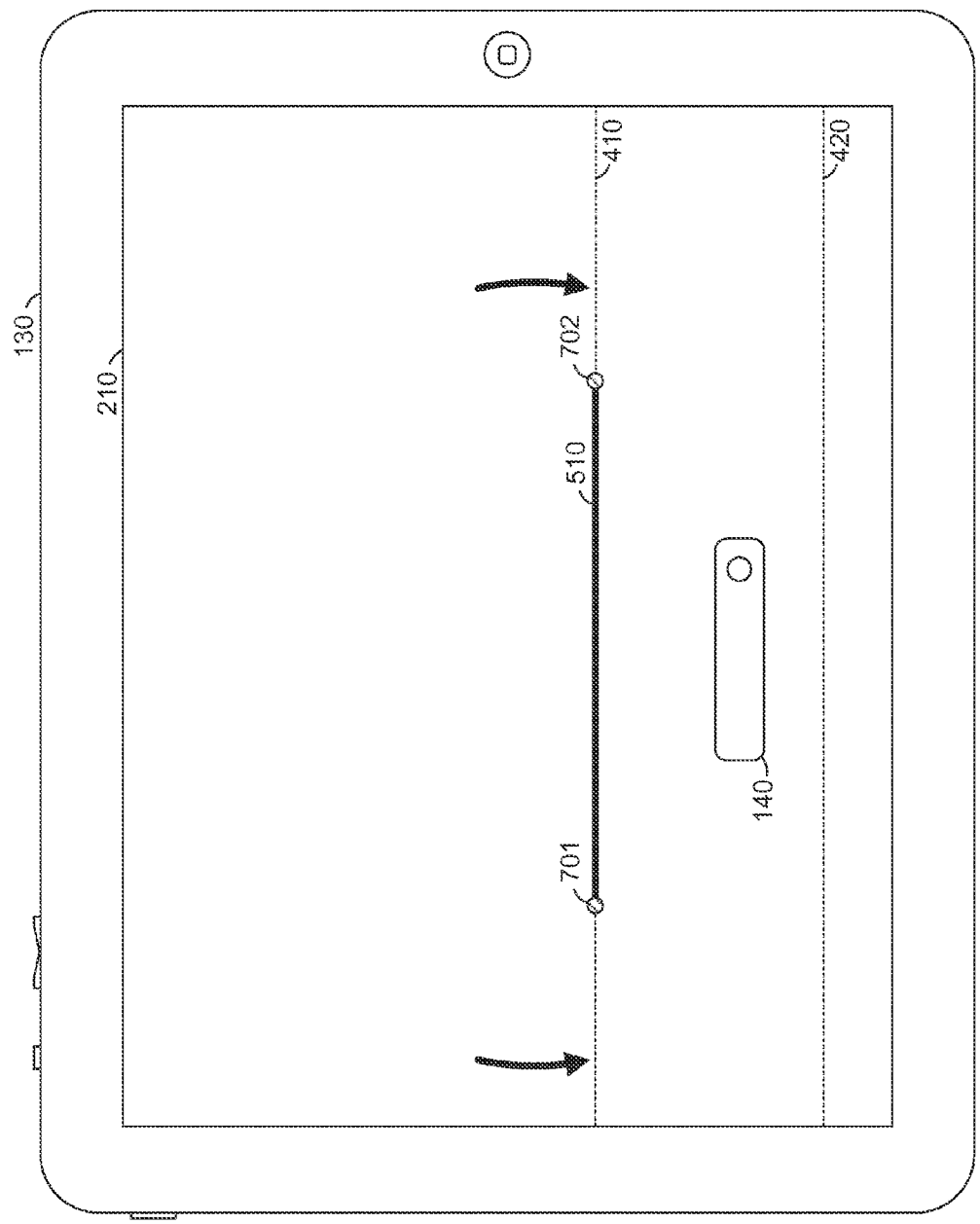
FIG. 8 is a top plan view of the touchscreen device, illustrating the guide device, the guide lines, and the selected drawn line being moved together, according to some example embodiments.

FIG. 8 is atop plan view of the touchscreen device 130, illustrating the guide device 140, the guide lines 410 and 420, and the selected drawn line 510 (e.g., with highlighted endpoints 701 and 702) being moved together (e.g., in unison), according to some example embodiments. For example, supposing that the user 132 selected the "move" function from the menu 710 of edits (e.g., shown in FIG. 7), movement of the guide device 140 by the user 132 may cause the guide lines 410 and 420 and the drawn line 510 to be moved together and in unison. As shown by the curved arrows in FIG. 8, the guide device 140, the guide lines 410 and 420, and the drawn line 510 may be moved as a group to another location on the touchscreen 210.

Figure 9:
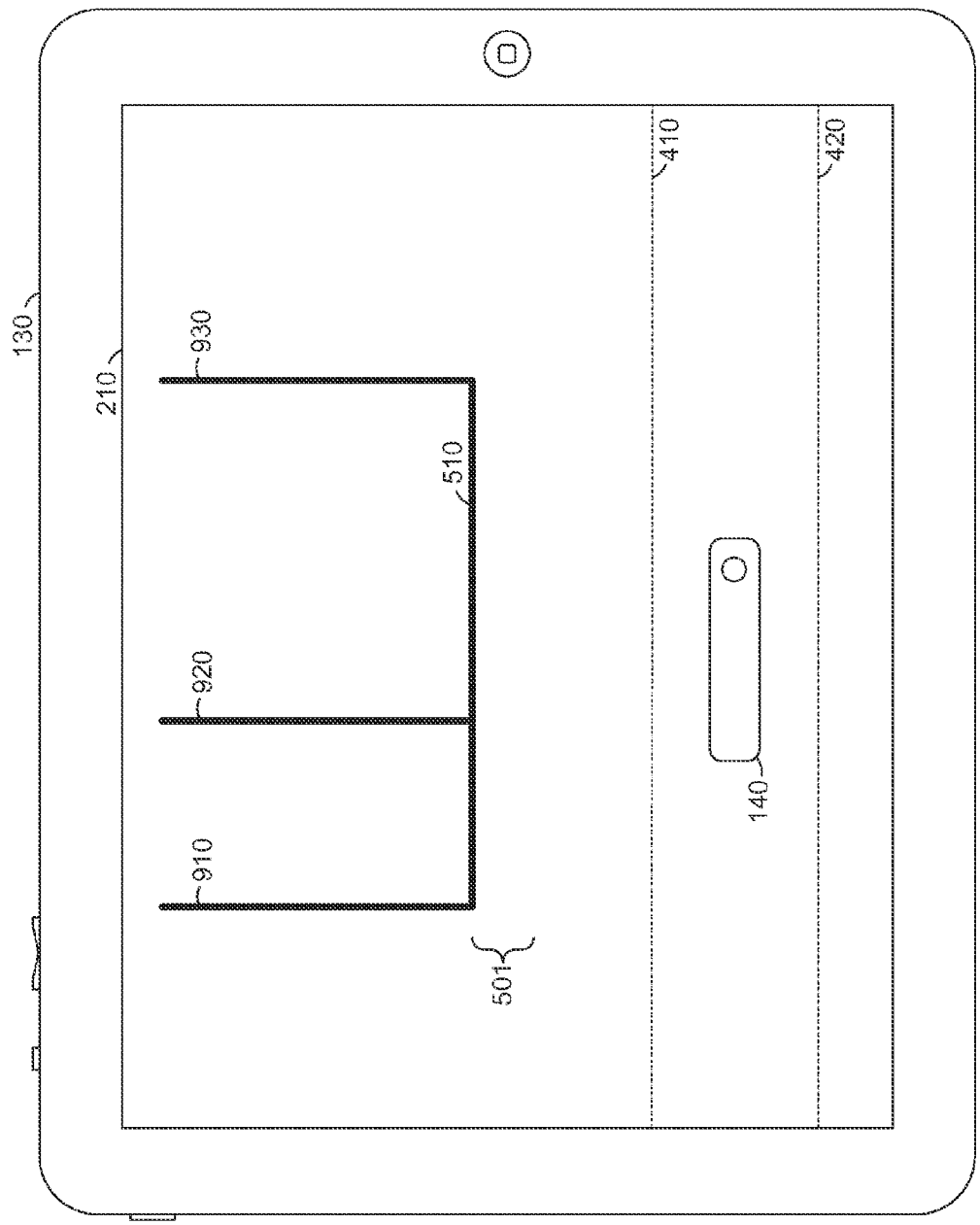
FIG. 9 is a top plan view of the touchscreen device, illustrating the guide device, the guide lines, and multiple drawn lines, according to some example embodiments.

FIG. 9 is a top plan view of the touchscreen device 130, illustrating the guide device 140, the guide lines 410 and 420, and drawn lines 510, 910, 920, and 930, according to some example embodiments. The drawn lines 510, 910, 920, and 930 may be all or part of a previously drawn set of lines, shapes, or any suitable combination thereof (e.g., previously drawn by the user 132 on the touchscreen 210). As shown in FIG. 9, both of the guide lines 410 and 420 are beyond the threshold distance 501 of the drawn lines 510, 910, 920, and 930.

Figure 10:
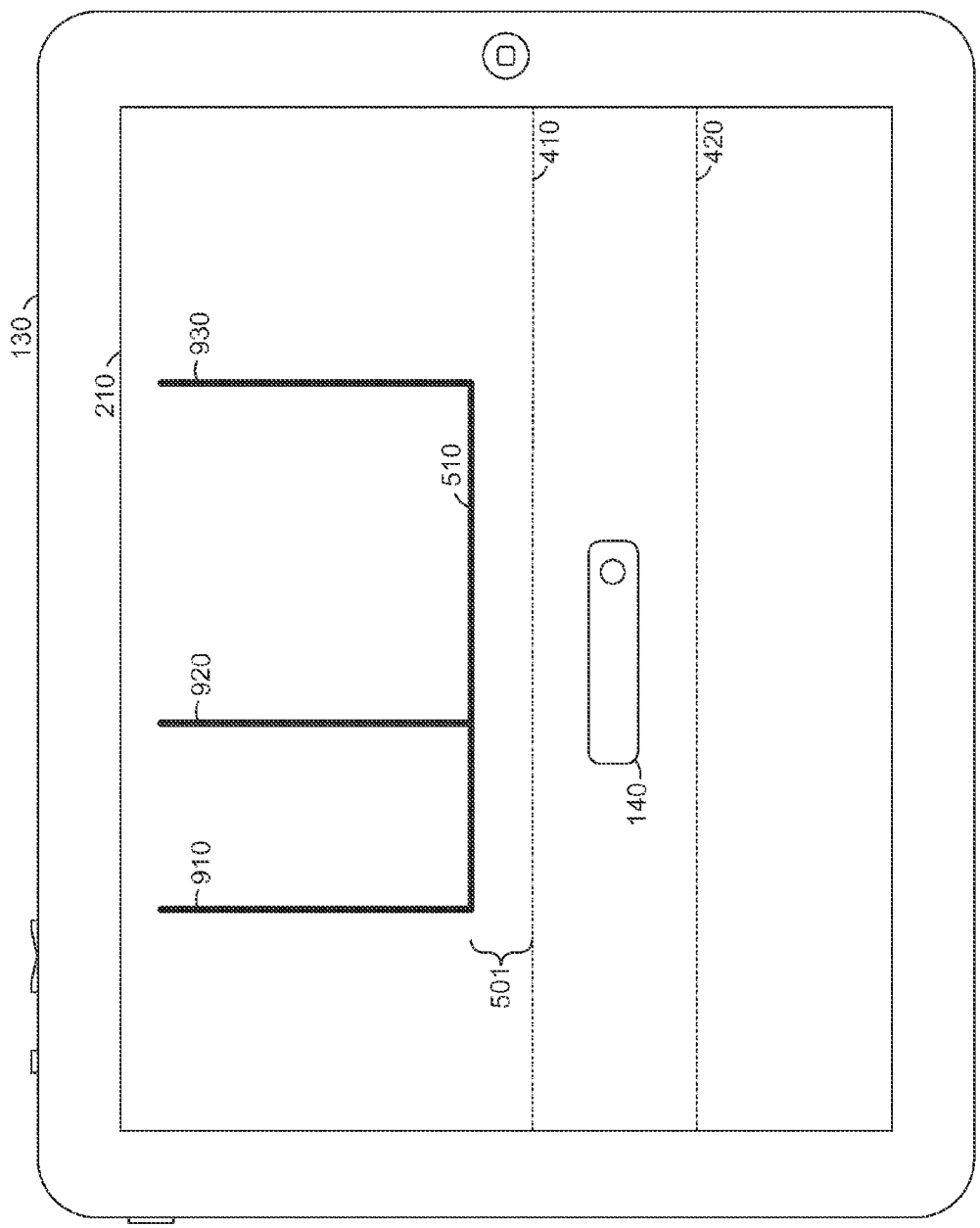
FIG. 10 is a top plan view of the touchscreen device, illustrating the guide device and the guide lines being moved closer to the drawn lines so that a guide line is within a threshold distance of one of the drawn lines, according to some example embodiments.

FIG. 10 is a top plan view of the touchscreen device 130, illustrating the guide device 140 and the guide lines 410 and 420 all being moved closer (e.g., together and in unison) to the drawn lines 510, 910, 920, and 930 so that the guide line 410 is within the threshold distance 501 of the drawn lines 510, 910, 920, and 930, according to some example embodiments. For example, as noted above, the threshold distance 501 may be defined as a quantity of pixels (e.g., 400 pixels), a physical distance (e.g., 1.3 inches), or any suitable combination thereof, on the touchscreen 210. The fact that the guide line 410 is within the threshold distance 501 of the drawn lines 510, 910, 920, and 930 may be determined by detecting that a point (e.g., a first point) on the guide line 410 is within the threshold distance 501 of a point (e.g., a second point) on the drawn line 510, a point (e.g., a third point) on the drawn line 910, a point (e.g., a fourth point) on the drawn line 920, a point (e.g., a fifth point) on the drawn line 930, or any suitable combination thereof.

Figure 11:
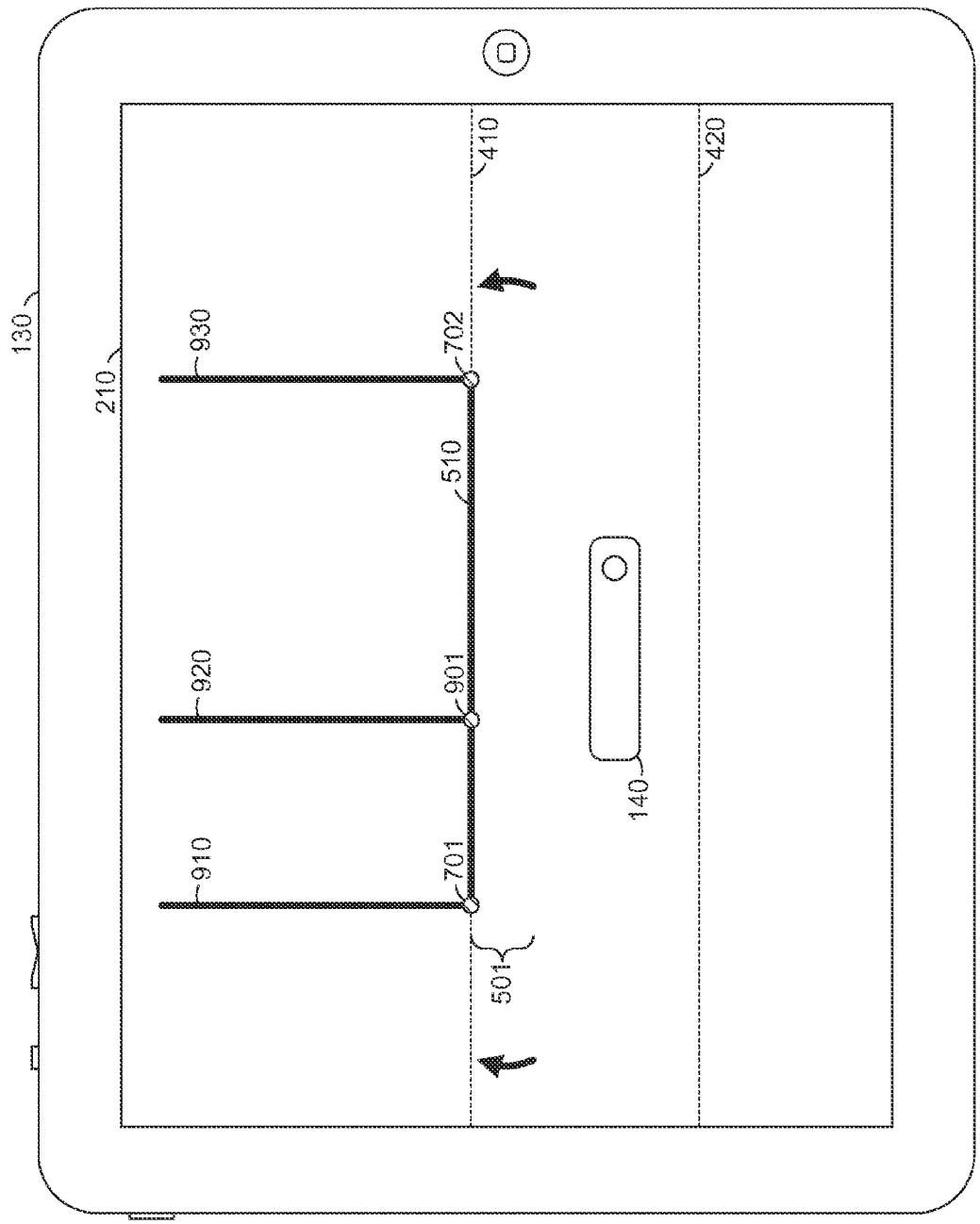
FIG. 11 is a top plan view of the touchscreen device, illustrating a guide line being automatically moved to coincide with a selected drawn line, which may indicate that the drawn line is automatically selected for potential moving, according to some example embodiments.

FIG. 11 is a top plan view of the touchscreen device 130, illustrating the guide line 410 being automatically moved to coincide with the drawn line 510, which may indicate that the drawn line 510 is automatically selected for potential editing, according to some example embodiments. As shown in FIG. 11, the drawn line 510 intersects the drawn line 910 at the endpoint 701 of the drawn line 510. Similarly, the drawn line 510 intersects the drawn line 920 at point 901 (e.g., a point that is collinear with the endpoints 701 and 702), and the drawn line 510 intersects the drawn line 930 at the endpoint 702 of the drawn line 510. As shown by the curved arrows in FIG. 11, the guide line 410 has moved towards the drawn line 510 by an amount equal to the threshold distance 501 from its former position depicted in FIG. 10. In FIG. 11, the guide line 410 now coincides with the drawn line 510 and intersects the drawn lines 910, 920, and 930.

Moreover, as shown in FIG. 11, one or more of the endpoints 701 and 702 of the drawn line 510 may be highlighted (e.g., to further indicate that the drawn line 510 is automatically selected for potential editing). Likewise, the point 901 at which the guide line 410 intersects the drawn line 920 may also be highlighted. In particular, the endpoints 701 and 702 and the point 901 may be highlighted by displaying markers (e.g., icons) on the endpoints 701 and 702 and the point 901. Such markers may be wider than the drawn lines 510, 910, 920, and 930, colored differently from the drawn lines 510, 910, 920, and 930, or any suitable combination thereof. In situations where a marker is wider than the drawn lines 510, 910, 920, and 930, the marker may be called a "bumper."

Figure 12:
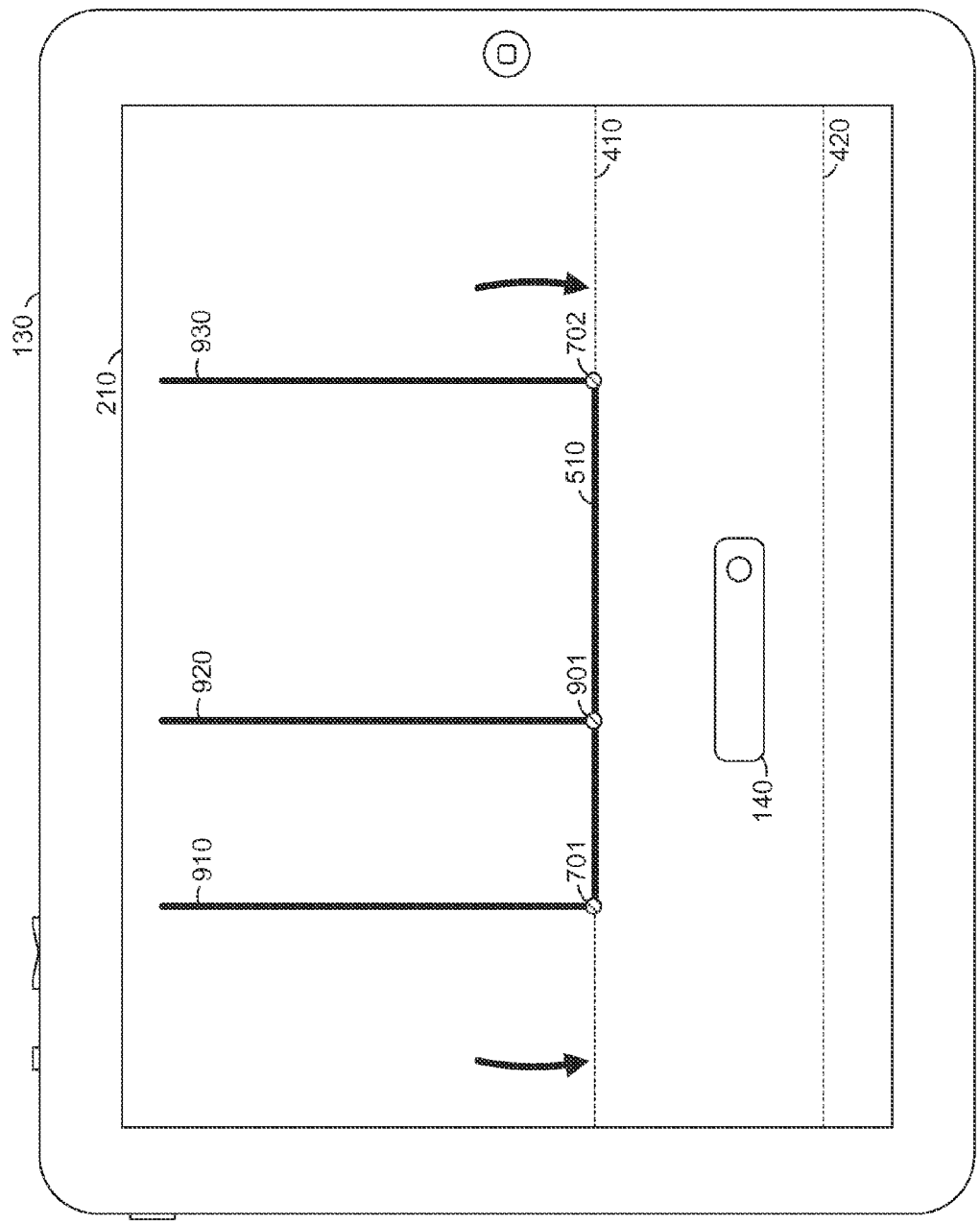
FIG. 12 is a top plan view of the touchscreen device, illustrating the guide device, the guide lines, and the selected drawn line being moved together, which may result in altering the lengths of the other drawn lines, according to some example embodiments.

FIG. 12 is a top plan view of the touchscreen device 130, illustrating the guide device 140, the guide lines 410 and 420, and the selected drawn line 510 (e.g., with highlighted endpoints 701 and 702) being moved together (e.g., in unison), according to some example embodiments. For example, with the drawn line 510 automatically selected (e.g., for a "move" function), movement of the guide device 140 by the user 132 may cause the guide lines 410 and 420 and the drawn line 510 to be moved together and in unison. As shown by the curved arrows in FIG. 12, the guide device 140, the guide lines 410 and 420, and the drawn line 510 may be moved as a group to another location on the touchscreen 210.

Furthermore, this movement of the drawn line 510 may modify the lengths of the drawn lines 910, 920, and 930 (e.g., by stretching or shrinking). In the example shown in FIG. 12, the lengths of the drawn lines 910, 920, and 930 are increased (e.g., stretched) by moving the endpoints 701 and 702 and the point 901, where the drawn lines 910, 930, and 920 respectively intersect the selected drawn line 510, as the drawn line 510 is being moved in accordance with movement of the guide device 140.

Figure 13:
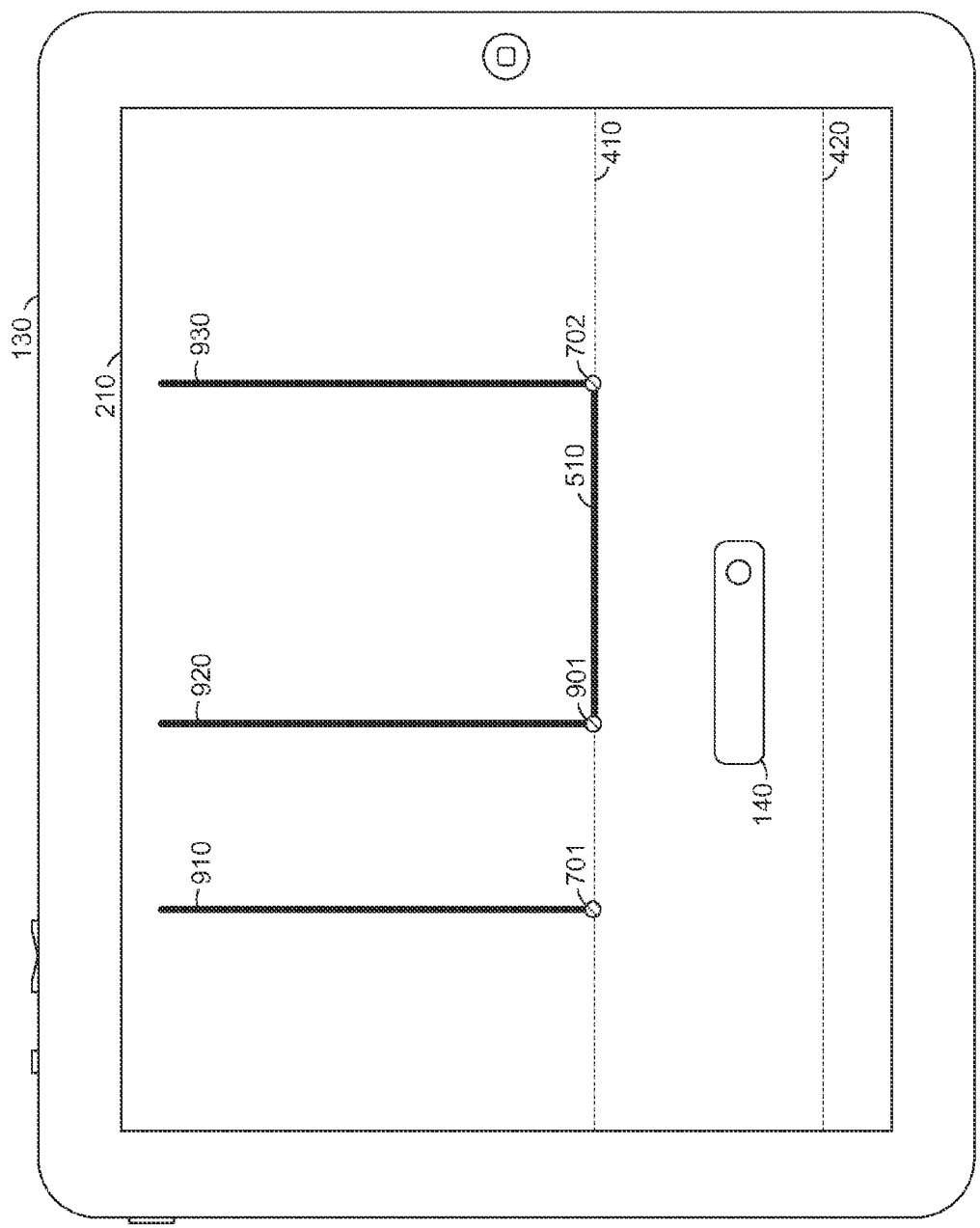
FIG. 13 is a top plan view of the touchscreen device, illustrating a modification of a first segment of the selected drawn line, without modifying a second segment of the selected drawn line, according to some example embodiments.

FIG. 13 is a top plan view of the touchscreen device 130, illustrating a modification (e.g., a deletion) of a first segment (e.g., between the endpoint 701 and the point 901) of the selected drawn line 510, without modifying a second segment (e.g., between the point 901 and the endpoint 702) of the selected drawn line 510, according to some example embodiments. For example, automatic selection of the drawn line 510 (e.g., for a "delete" function) may automatically select the first and second segments individually (e.g., for the same "delete" function). Accordingly, a touch input (e.g., by the stylus 150 or a fingertip of the user 132) on the first segment may cause the first segment to be modified (e.g., deleted) without modifying (e.g., deleting) the second segment.

Figure 14:
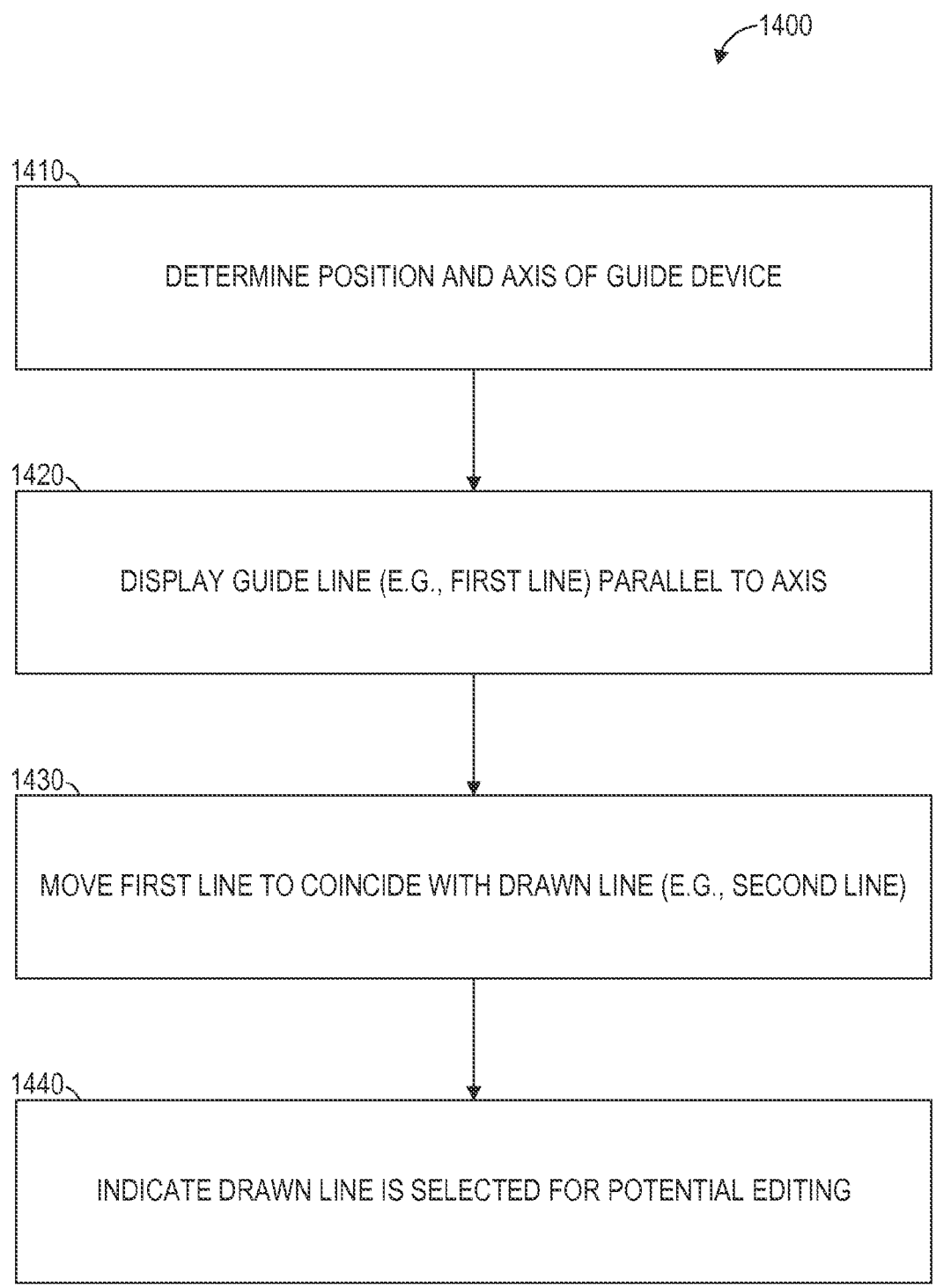
FIGS. 14-16 are flowcharts illustrating operations of the touchscreen device in performing a method of editing on a touchscreen, according to some example embodiments.
Figure 15:
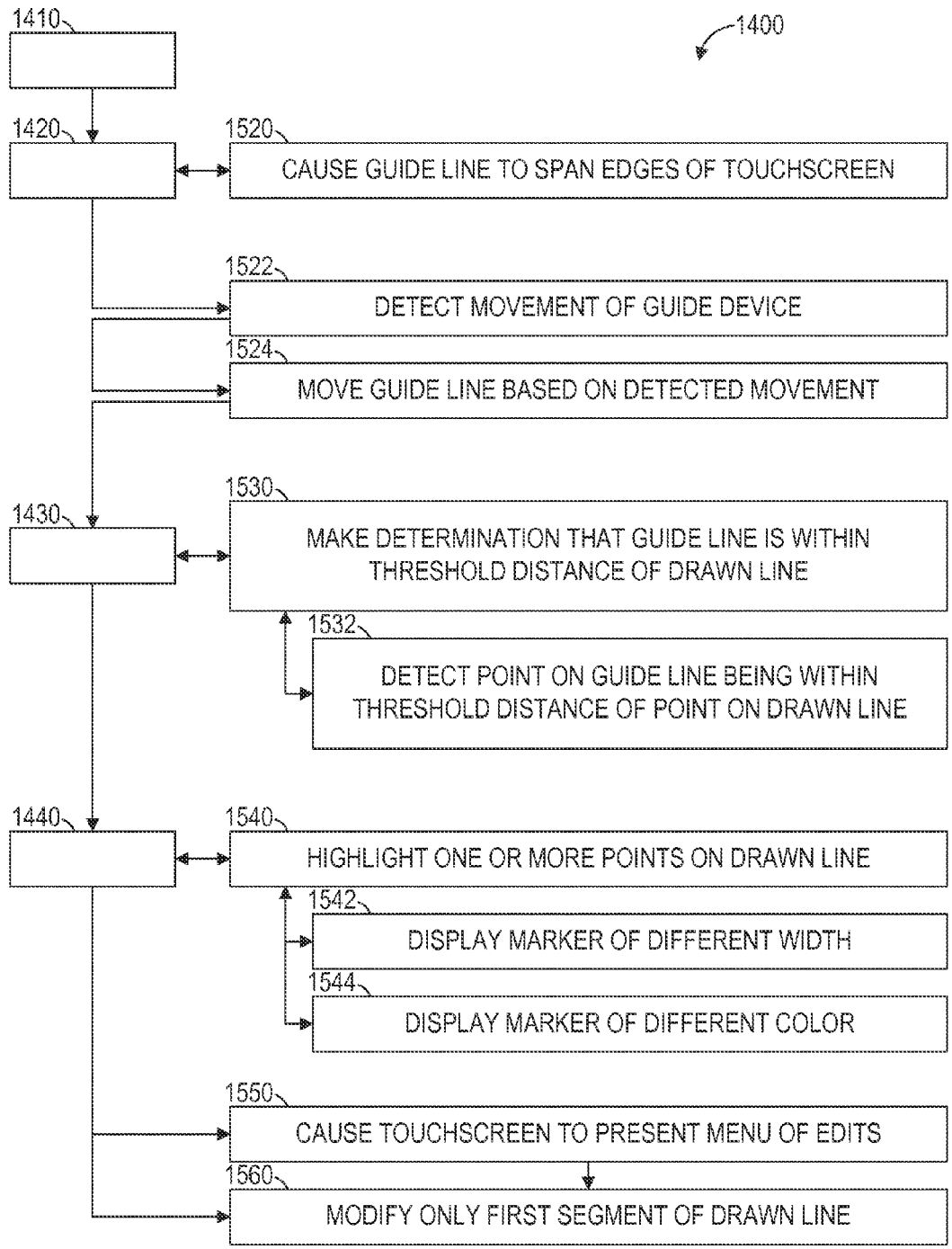
Figure 16:
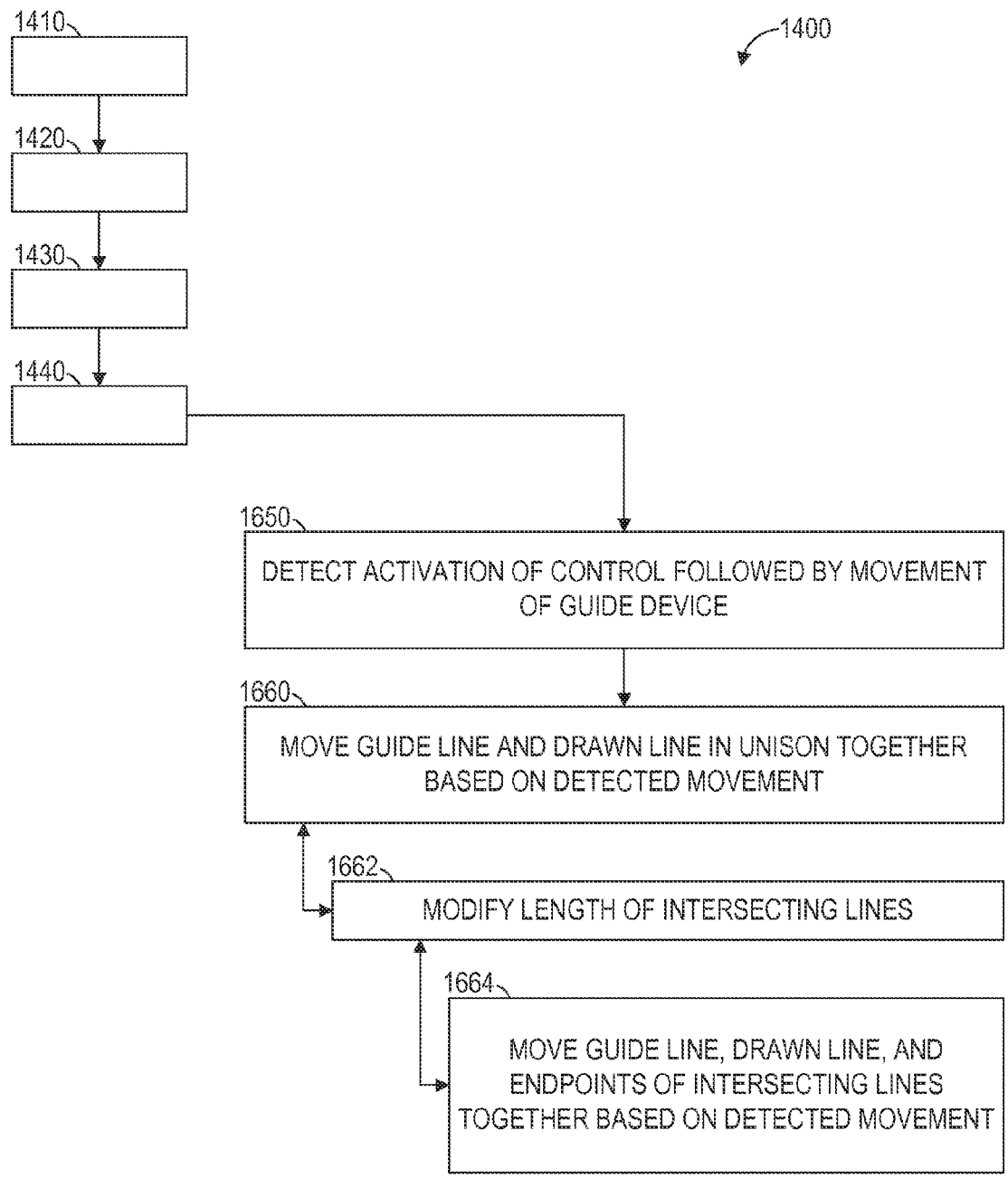

FIGS. 14-16 are flowcharts illustrating operations of the touchscreen device 130 in performing a method 1400 of editing on the touchscreen 210, according to some example embodiments. Operations in the method 1400 may he performed using modules described above with respect to FIG. 2. As shown in FIG. 14, the method 1400 includes operations 1410, 1420, 1430, and 1440.

In operation 1410, the analysis module 230 determines a position of the guide device 140 on the touchscreen 210 and also determines the axis 440 of the guide device 140. This determination may be made based on one or more touches (e.g., touch input) detected by the touch module 220. For example, the touch module 220 may detect a set of one or more locations at which placement of the guide device 140 on the touchscreen 210 triggers a corresponding set of one or more contact points on the touchscreen 210, and the analysis module 230 may determine the position and the axis 440 of the guide device 140 based on the set of locations detected b the touch module 220.

In operation 1420, the output module 240 displays the guide line 410 (e.g., a first line) on the touchscreen 210. As noted above, the guide line 410 may be displayed parallel to the axis 440 of the guide device 140. Furthermore, the guide line 410 may be displayed on the touchscreen 210 white the touchscreen 210 displays the drawn line 510 (e.g., a second line).

In operation 1430, the output module 240 moves the guide line 410 (e.g., the first line) to coincide with the drawn line 510 (e.g., the second line). This movement may be in response to a determination that the guide line 410 is within the threshold distance 501 of the drawn line 510.

In operation 1440, the output module 240 indicates that the drawn line 510 (e.g., the second line), which is now coincident with the moved guide line 410 (e.g., the first line), is selected (e.g., automatically) for potential editing. This may be indicated by highlighting the drawn line 510, presenting the menu 710 of edits, or both.

As shown in FIG. 15, the method 1400 may also include one or more of operations 1520, 1522, 1524, 1530, 1532, 1540, 1542, 1544, 1550, and 1560. Operation 1520 may be performed as part (e.g., a precursor task, a subroutine, or a portion) of operation 1420, in which the output module 240 displays the guide line 410. In operation 1520, the output module 240 causes the guide line 410 (e.g., the first line) to span multiple edges of the touchscreen 210. For example, the guide line 410 may extend from a left edge of the touchscreen 210 to a right edge of the touchscreen 210 (e.g., as shown in FIG. 5). As additional examples, the guide line 410 may stretch between any edge (e.g., left, top, right, or bottom) of the touchscreen 210 and any other edge of the touchscreen 210. This may have the effect of enabling the guide line 410 to remain at least partially visible on the touchscreen 210 (e.g., to the user 132), whether or not it is displayed coincident with the drawn line 510. In situations where the drawn line 510 is wider than the guide line 410 or overlaid upon the guide line 410 this may have the effect of enabling the drawn line 510 to remain at least partially visible on the touchscreen 210 (e.g., to the user 132).

Operations 1522 and 1524 may be performed prior to operation 1430, in which the output module 240 moves the guide line 410 (e.g., the first line) to coincide with the drawn line 510 (e.g., the second line). In operation 1522, the analysis module 230 detects movement of the guide device 140 on the touchscreen 210. This determination may be made based on movement of one or more touches (e.g., touch input) detected by the touch module 220. For example, the touch module 220 may detect changes in one or more locations at which placement of the guide device 140 on the touchscreen 210 triggers a corresponding set of one or more contact points on the touchscreen 210, and the analysis module 230 may determine that the guide device 140 is moving on the touchscreen 210.

In operation 1524, the output module 240 moves the guide line 410 based on the detected movement of the guide device 140. This may have the effect of moving the guide line 410 in accordance with the guide device 140 (e.g., staying parallel to the axis 440 of the guide device 140 and displayed at a distance apart from the guide device 140).

Operation 1530 may be performed as part of operation 1430, in which the output module 240 moves the guide line 410 to coincide with the drawn line 510. In operation 1530, the analysis module 230 makes a determination that the guide line 410 is within the threshold distance 501 of the drawn line 510. According to various example embodiments, this determination may be performed in response to operation 1524, in which the guide line 410 is moved based on the detected movement of the guide device 140.

As shown in FIG. 15, operation 1532 may be performed as part of operation 1530. In operation 1532, the analysis module 230 detects that a point (e.g., a first point) on the guide line 410 is within the threshold distance 501 of a point (e.g., a second point) on the drawn line 510. According to various example embodiments, this detection may be performed in response to operation 1524, in which the guide line 410 is moved based on the detected movement of the guide device 140.

Operation 1540 may be performed as part of operation 1440, in which the output module 240 indicates that the drawn line 510 (e.g., the second line) is selected. In operation 1540, the output module 240 highlights one or more points (e.g., collinear points) on the selected drawn line 510, which at this point is coincident with the moved guide line 410 (e.g., the first line). For example, the output module 240 may highlight the endpoints 701 and 702 of the drawn line 510 (e.g., as shown in FIG. 7). As another example, the endpoints 701 and 702, as well as the point 901, may be highlighted (e.g., as shown in FIG. 11).

One or more of operations 1542 and 1544 may be performed as part of operation 1540, in which the output module 240 highlights one or more points (e.g., collinear points) on the selected drawn line 510 (e.g., the second line in operation 1542, the output module 240 highlights a point (e.g., endpoint 701, endpoint 702, or point 901) by displaying a marker (e.g., an icon) that is wider than the selected drawn line 510. In operation 1544, the output module 240 highlights a point (e.g., endpoint 701, endpoint 702, or point 901) by displaying a marker that is colored differently than the selected drawn line 510 at the highlighted point. Examples of the combined effects of operations 1542 and 1544 are illustrated in FIGS. 7 and 11.

Operation 1550 may be performed after operation 1440 (e.g., in response to operation 1440). In some example embodiments, however, operation 1550 is performed as part of operation 1440. In operation 1550, the output module 240 causes the touchscreen 210 to present the menu 710 of edits (e.g., as shown in FIG. 7). As discussed above, the menu 710 of edits may present one or more editing operations that are available to be selected for application to the selected drawn line 510 or any segment thereof.

In some situations, performance of operation 1440 results in the highlighting of the endpoint 701 (e.g., a first collinear point), the point 901 (e.g., a second collinear point), and the endpoint 702 (e.g., a third collinear point), all on the selected drawn line 510 (e.g., the second line). As noted above, a first segment of the drawn line 510 may be defined between the endpoint 701 and the point 901, and a second segment of the drawn line 510 may be defined between the point 901 and the endpoint 702. In operation 1560, the output module 240 modifies (e.g., deletes) only the first segment of the drawn line 510 (e.g., without modifying the second segment of the drawn line 510). Such a situation is discussed above with respect to FIG. 13. According to various example embodiments, this modification may be performed in accordance with a selection by the user 132 of an editing operation (e.g., presented in the menu 710 of edits) that is available for application to the selected drawn line 510 or any segment thereof.

As shown in FIG. 16, the method 1400 may also include one or more of operations 1650, 1660, 1662, and 1664. In operation 1650, the analysis module 230 detects activation of a control (e.g., by the user 132 touching an offered function within the menu 710 of edits, or by the user 132 pressing a hardware button on the guide device 140) followed by movement of the guide device 140 on the touchscreen 210. As noted above, the activation of the control may indicate that the subsequent movement of the guide device 1.40 is input for performing a selected editing operation (e.g., a "move" function) on the selected drawn line 510 (e.g., the second line) or a segment thereof. For example, the activation of the control may indicate that the detected movement is input for moving the selected drawn line 510 on the touchscreen 210.

In operation 1660, the output module 240 moves the guide line 410 (e.g., the first line) and the selected drawn line 510 (e.g., the second line) in unison together based on the detected movement of the guide device 140 (e.g., as detected in operation 1650). For example, this unison movement may be part of moving the guide device 140, the guide lines 410 and 420, and the drawn line 510 as a group to another location on the touchscreen 210.

According to some example embodiments, operation 1662 may be performed as part of operation 1660. In operation 1662, the movement of the drawn line 510 accordingly modifies one or more lengths of the drawn lines 910, 920, and 930 (e.g., by stretching or shrinking). As noted above with respect to FIG. 12, the lengths of the drawn lines 910, 920, and 930 may be increased (e.g., stretched) by moving the endpoints 701 and 702 and the point 901, where the drawn lines 910, 930, and 920 respectively intersect the selected drawn line 510, as the drawn line 510 is being moved in accordance with movement of the guide device 140. Similarly, the lengths of the drawn lines 910, 920, and 930 may be decreased (e.g., shrunk) by moving the endpoints 701 and 702 and the point 901, as the drawn line 510 is being moved in accordance with movement of the guide device 140.

According to certain example embodiments, operation 1664 may be performed as part of operation 1662. In operation 1664, the output module 240 moves the guide lines 410 and 420 and the drawn line 510 as a single group in accordance with the movement of the guide device 140 (e.g., as detected in operation 1650). This may have the effect or appearance of allowing the user 132 to move the guide device 140, the guide lines 410 and 420, the drawn line 510, along with the endpoints 701 and 702 and the point 901 (e.g., where the drawn lines 910, 930, and 920 respectively intersect the selected drawn line 510), altogether and in unison, as a single group from one location to another location on the touchscreen 210.

According to various example embodiments, one or more of the methodologies described herein may facilitate editing on a touchscreen. Moreover, one or more of the methodologies described herein may facilitate automatic selection of a previously drawn line, which may include an endpoint of an intersecting line, for potential editing. Hence, one or more of the methodologies described herein may facilitate provision of a convenient or intuitive user interface for selecting one or more parts of a drawing that is displayed on the touchscreen. Moreover, one or more of the methodologies described herein may facilitate provision of a user interface that quickly and easily allows a user to select a part of a drawing. Furthermore, one or more the methodologies described herein may facilitate provision of a user interface that automatically selects a part of a drawing for potential editing.

When these effects are considered in aggregate, one or more of the methodologies described herein may obviate a need for certain efforts or resources that otherwise would be involved in editing on a touchscreen, providing a convenient and intuitive user interface for automatic or manual selection of one or more parts of a drawing displayed on the touchscreen. Efforts expended by a user in creating and editing drawings on a touchscreen may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 17:
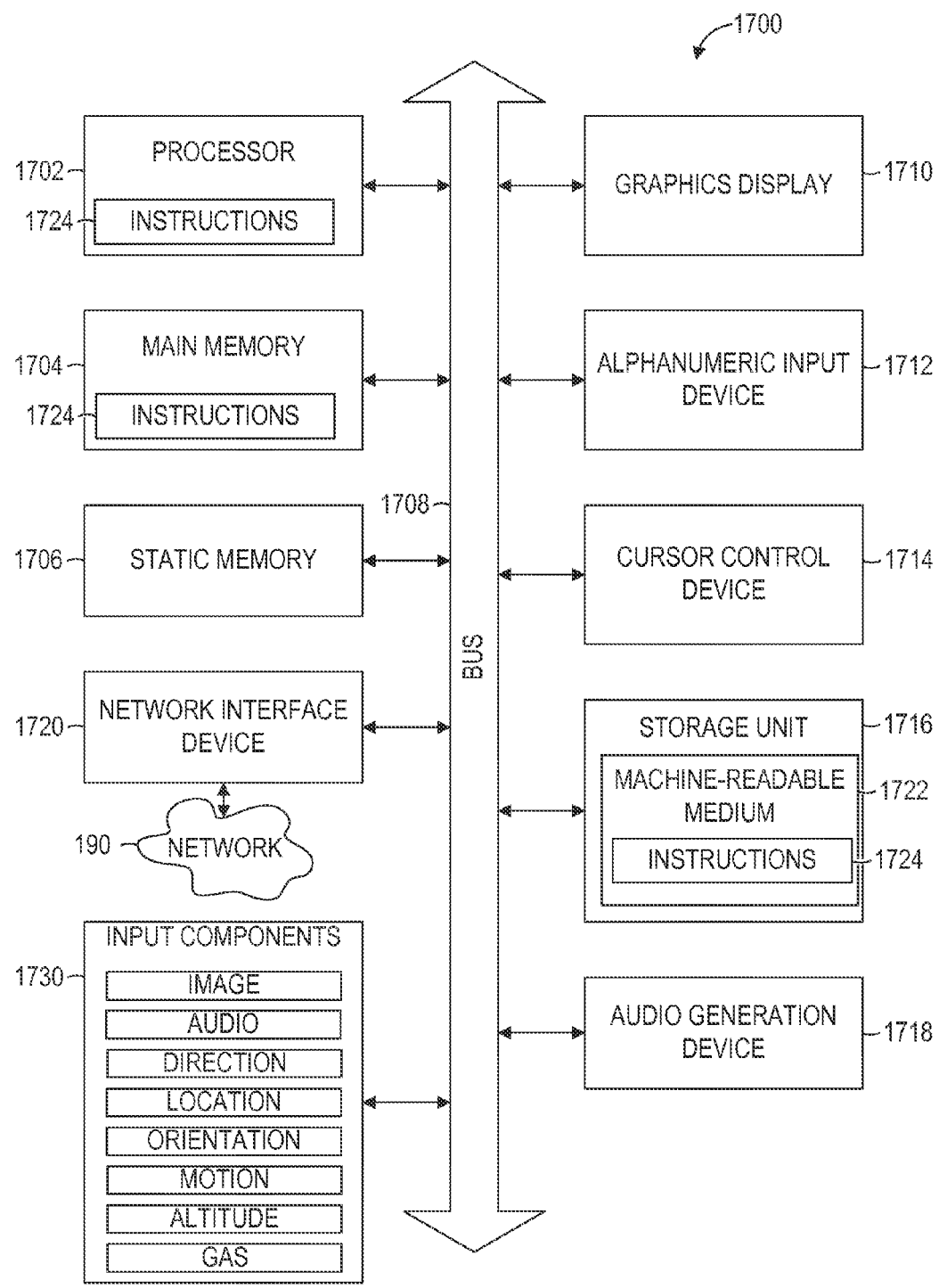
FIG. 17 is a block diagram illustrating components of a machine, according to some example embodiments, able to read instructions from a machine-readable medium and perform any one or more of the methodologies discussed herein.

FIG. 17 is a block diagram illustrating components of a machine 1700, according to some example embodiments, able to read instructions 1724 from a machine-readable medium 1722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 17 shows the machine 1700 in the example form of a computer system (e.g., a computer) within which the instructions 1724 (e,g., software, a program, an application, an applet, an app, or other executable code) for causing the machine 1700 to perform any one or more of the methodologies discussed herein may be executed, in whole or in part.

In alternative embodiments, the machine 1700 operates as a standalone device or may be connected (e.g., networked) to other machines. In a networked deployment, the machine 1700 may operate in the capacity of a server machine or a client machine in a server-client network environment, or as a peer machine in a distributed (e,g., peer-to-peer) network environment. The machine 1700 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1724, sequentially or otherwise, that specify actions to be taken by that machine. Further, while only a single machine is illustrated, the term "machine" shall also be taken to include any collection of machines that individually or jointly execute the instructions 1724 to perform all or part of any one or more of the methodologies discussed herein.

The machine 1700 includes a processor 1702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1704, and a static memory 1706, which are configured to communicate with each other via a bus 1708. The processor 1702 may contain microcircuits that are configurable, temporarily or permanently, by some or all of the instructions 1724 such that the processor 1702 is configurable to perform any one or more of the methodologies described herein, in whole or in part. For example, a set of one or more microcircuits of the processor 1702 may be configurable to execute one or more modules (e,g., software modules) described herein.

The machine 1700 may further include a graphics display 1710 (e.g., a plasma display panel (PDP), a light emitting diode (LED) display, a liquid crystal display (LCD), a projector, a cathode ray tube (CRT), or any other display capable of displaying graphics or video). The machine 1700 may also include an alphanumeric input device 1712 (e.g., a keyboard or keypad), a cursor control device 1714 (e.g., a mouse, a touchpad, a trackball, a joystick, a motion sensor, an eye tracking device, or other pointing instrument), a storage unit 1716, an audio generation device 1718 (e.g., a sound card, an amplifier, a speaker, a headphone jack, or any suitable combination thereof), and a network interface device 1720.

The storage unit 1716 includes the machine-readable medium 1722 (e.g., a tangible and non-transitory machine-readable storage medium) on which are stored the instructions 1724 embodying any one or more of the methodologies or functions described herein. The instructions 1724 may also reside, completely or at least partially, within the main memory 1704, within the processor 1702 (e.g., within the processor's cache memory), or both, before or during execution thereof by the machine 1700. Accordingly, the main memory 1704 and the processor 1702 may be considered machine-readable media (e.g., tangible and non-transitory machine-readable media). The instructions 1724 may be transmitted or received over the network 190 via the network interface device 1720. For example, the network interface device 1720 may communicate the instructions 1724 using any one or more transfer protocols (e.g., hypertext transfer protocol (HTTP)).

In some example embodiments, the machine 1700 may be a portable computing device, such as a smart phone or tablet computer, and have one or more additional input components 1730 (e.g., sensors or gauges). Examples of such input components 1730 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1724 for execution by the machine 1700, such that the instructions 1724, when executed by one or more processors of the machine 1700 (e.g., processor 1702), cause the machine 1700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term. "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result in this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   determining a position of a guide device on a touchscreen and an axis of the wide device on the touchscreen;
   displaying a first line on the touchscreen parallel to the axis of the guide device on the touchscreen while the touchscreen displays a second line on the to the touchscreen;
   using a processor, moving the first line to coincide with the second line in response to a determination that the first line is within a threshold distance of the second line; and
   indicating that the second line coincident with the moved first line is selected for potential editing.

2. The method of claim 1 further comprising:
   making the determination that the first line is within the threshold distance of the second line by detecting that a first point on the first line is within the threshold distance of a second point on the second line.

3. The method of claim 1 further comprising:
   detecting movement of the guide device on the touchscreen; and
   moving the first line on the touchscreen based on the detected movement of the guide device; and wherein
   the determination that the first line is within the threshold distance of the second line is made in response to the first line being moved based on the detected movement of the guide device.

4. The method of claim 1, wherein:
   the displaying of the first line causes the first line to span multiple edges of the touchscreen; and
   the moved first line allows the coincident second line to remain at least partially visible on the touchscreen.

5. The method of claim 1, wherein:
   the indicating that the second line is selected for potential editing includes highlighting a point on the second line coincident with the moved first line.

6. The method of claim 5, wherein:
   the highlighting of the point on the second line includes displaying a marker that is wider than the second line at the highlighted point on the second line coincident with the moved first line.

7. The method of claim 5, wherein:
   the highlighting of the point on the second line includes displaying a marker that is colored differently than the second line at the highlighted point on the second line coincident with the moved first line.

8. The method of claim 1 further comprising:
causing the touchscreen to present a menu of edits available or application to the second line indicated as selected for potential editing.

9. The method of claim 1, wherein:
the indicating that the second line is selected for potential editing includes highlighting collinear points on the second line coincident with the moved first line, the collinear points including a first collinear point, a second collinear point, and a third collinear point.

10. The method of claim 9, wherein:
the highlighting of the collinear points includes displaying markers at the collinear points on the second line.

11. The method of claim 9, wherein:
the first and second collinear points on the second line define a first segment of the second line;
the second and third collinear points on the second line define a second segment of the second line; and the method further comprises
modifying the first segment of the second line without modifying the second segment of the second line.

12. The method of claim 1 further comprising:
detecting activation of a control followed by movement of the guide device on the touchscreen, the activation of the control indicating that the detected movement is input for moving the second line on the touchscreen; and
moving the first and second lines coincident with each other based on the detected movement of the guide device on the touchscreen.

13. The method of claim 1, wherein:
the touchscreen displays a third line on the touchscreen;
the second line intersects the third line at an endpoint of the third line;
the moving of the first line to coincide with the second line moves the first line to coincide with the endpoint of the third line; and the method further comprises:
detecting activation of a control followed by movement of the guide device on the touchscreen, the activation of the control indicating that the detected movement is input for moving the endpoint of the third line; and
modifying a length of the third line by moving the endpoint of the third line based on the detected movement of the guide device on the touchscreen.

14. A non-transitory machine-readable storage medium comprising instructions that, when executed by one or more processors of a machine, cause the machine to perform operations comprising:
determining a position of a guide device on a touchscreen and an axis of the guide device on the touchscreen;
displaying a first line on the touchscreen parallel to the axis of the guide device on the touchscreen while the touchscreen displays a second line on the touchscreen;
moving the first line to coincide with the second line in response to a determination that the first line is within a threshold distance of the second line; and
indicating that the second line coincident with the moved first line is selected for potential editing.

15. The non-transitory machine-readable storage medium of claim 14, wherein:
the indicating that the second line is selected for potential editing includes highlighting collinear points on the second line coincident with the moved first line, the collinear points including a first collinear point, a second collinear point, and a third collinear point;
the first and second collinear points on the second line define a first segment of the second line;
the second and third collinear points on the second line define a second segment of the second line; and the operations further comprise
deleting the first segment of the second line without deleting the second segment of the second line.

16. The non-transitory machine-readable storage medium of claim 14, wherein the operations further comprise:
detecting activation of a control followed by movement of the guide device on the touchscreen, the activation of the control indicating that the detected movement is input for moving the second line on the touchscreen; and
moving the first and second lines coincident with each other based on the detected movement of the guide device on the touchscreen.

17. A system comprising:
one or more processors;
an analysis module that configures at least one processor among the one or more processors to determine a position of a guide device on a touchscreen and an axis of the guide device on the touchscreen; and
an output module that configures at least one processor among the one or more processors to:
display a first line on the touchscreen parallel to the axis of the guide device on the touchscreen while the touchscreen displays a second line on the touchscreen;
move the first line to coincide with the second line in response to a determination that the first line is within a threshold distance of the second line; and
indicate that the second line coincident with the moved first line is selected for potential editing.

18. The system of claim 17, wherein:
the output module configures the at least one processor to highlight collinear points on the second line coincident with the moved first line, the collinear points including a first collinear point, a second collinear point, and a third collinear point;
the first and second collinear points on the second line define a first segment of the second line;
the second and third collinear points on the second line define a second segment of the second line; and
the output module configures at least one processor to modify the first segment of the second line without modifying the second segment of the second line.

19. The system of claim 17 further comprising:
a touch module that configures at least one processor among the one or more processors to detect activation of a control followed by movement of the guide device on the touchscreen, the activation of the control indicating that the detected movement is input for moving the second line on the touchscreen; and wherein
the output module configures at least one processor to move the first and second lines coincident with each other based on the detected movement of the guide device on the touchscreen.

20. The system of claim 17, wherein:
the touchscreen displays a third line on the touchscreen;
the second line intersects the third line at an endpoint of the third line;
the output module configures the at least one processor to move the first line to coincide with the endpoint of the third line; and the system further comprises:
a touch module that configures at least one processor among the one or more processors to detect activation of a control followed by movement of the guide device on the touchscreen, the activation of the control indicating that the detected movement is input for moving the endpoint of the third line; and wherein the output module configures at least one processor to modify a length of the third line by moving the endpoint of the third line based on the detected movement of the guide device on the touchscreen.

\* \* \* \* \*